United States Patent
Enomoto et al.

(10) Patent No.: US 6,891,888 B2
(45) Date of Patent: May 10, 2005

(54) IMAGE PROCESSING METHOD AND IMAGE PROCESSING APPARATUS

(75) Inventors: Jun Enomoto, Kanagawa (JP); Yuji Hara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 740 days.

(21) Appl. No.: 09/815,287

(22) Filed: Mar. 23, 2001

(65) Prior Publication Data

US 2001/0033370 A1 Oct. 25, 2001

(30) Foreign Application Priority Data

Mar. 23, 2000 (JP) .................................... 2000-081441

(51) Int. Cl.⁷ .......................... H04N 7/12; H04N 5/253
(52) U.S. Cl. .................... 375/240.01; 348/96
(58) Field of Search ................... 348/96, 97, 104, 348/102, 107, 110, 112, 390.1; 31/390.1; 375/240.01; H04N 5/253, 7/12

(56) References Cited

U.S. PATENT DOCUMENTS 5,585,833 A * 12/1996 Matumoto ................ 347/183
6,072,916 A * 6/2000 Suzuki ...................... 382/303
6,219,129 B1 * 4/2001 Kinjo et al. ................ 355/40
6,317,152 B1 * 11/2001 Hobson et al. ............. 348/150
6,320,672 B1 * 11/2001 Itoh .......................... 358/1.9
6,603,885 B1 * 8/2003 Enomoto ................... 382/263

FOREIGN PATENT DOCUMENTS

JP  10-117262  5/1998  ............ H04N/1/00
JP  11-234514  8/1999  ............ H04N/1/40

* cited by examiner

Primary Examiner—Nhon Diep
(74) Attorney, Agent, or Firm—Sughrue Mion, PLLC

(57) ABSTRACT

The image processing method and apparatus read photo-electrically an original image to obtain input image data and subject the input image data to image processing to obtain output image data. The method and apparatus perform first conversion for outputting an image file and second conversion for outputting a print as the image processing on the input image data obtained by a single image reading operation and output first image data for outputting the image file and second image data for outputting the print. The method and apparatus make it possible to output both of the photographic print and the image file, which have a good image quality, by a simple operation and with a high operation efficiency.

29 Claims, 5 Drawing Sheets

IMAGE PROCESSING METHOD AND IMAGE PROCESSING APPARATUS

BACKGROUND OF THE INVENTION

The present invention relates to the technical field of a digital image processing for use in digital photoprinters and the like, more particularly to an image processing method and an image processing apparatus, which make it possible to obtain outputs from both of a photographic print and an image file with a simple operation and an excellent operation efficiency.

An image captured on a photograph film such as a negative film and a reversal film (hereinafter referred to as a film) has mainly been printed onto a photosensitive material (printing paper) by means of a so-called a direct exposure, which is performed in such a manner that an image on the film is projected onto the photosensitive material to be exposed.

On the contrary, a printing apparatus using a digital exposure, that is, a digital photoprinter has recently been put to practical use, which prints an image recorded on a film in such a manner that the image is read out photoelectrically to be converted to digital signals, the digital signals undergo various kinds of image processing to produce image data for recording, and a recording light modulated in response to the image data scans and exposes a photosensitive material to record a latent image thereonto, thus obtaining a finished print.

The digital photoprinter typically comprises: a scanner (image reading-out unit) which allows a reading light to be incident onto a film and re ds out a projected light to photoelectrically read out an image recorded on the film; an image processing apparatus which performs a predetermined processing for image data read out by the scanner or supplied from a digital camera or the like to obtain the image data, namely, exposure data, for image recording; a printer (image recording apparatus) which scans a photosensitive material by, for example, a light beam scanning depending on the image data output from the image processing apparatus to expose the photosensitive material, thus recording a latent image; and a processor (developing unit) which performs a developing process for the photosensitive material exposed by the printer to produce a (finished) print bearing a reproduced image.

The digital photoprinter as described above can perform processing (suit) of an image by processing the image data. Accordingly, the digital photoprinter performs a gradation adjustment, a color balance adjustment and a color/density adjustment desirably, and can achieve a high quality print that could not be achieved by a conventional direct exposure.

The digital photoprinter deals with an image as a digital image data, and hence the digital photoprinter can output as a print not only an image captured on a film but also an image captured with a digital camera and the like and an image obtained by communication means such as Internet and the like.

Furthermore, since the digital photoprinter deals with the image as the digital image data, the digital photoprinter can output not only a photographic print but also image data (image file) of an image reproduced on the photographic print onto various kinds of recording mediums such as CD-Rs and MOs (magneto-optical recording mediums). Thus, both of the photographic print and the image file (recording medium recording the image file) can be offered according to a demand from a customer (client requesting a print preparation).

The applicant of this application discloses an image processing apparatus (image recording apparatus) capable of outputting both of the photographic print and the image file in Japanese Patent Laid-Open No. 117262/1998 and No. 234514/1999. According to the apparatus disclosed in these gazettes, it is possible to output both of the photographic print and the image file if necessary to offer them to a customer.

However, a demand for image quality of the photographic print and a demand for quality of the image file (image quality of a reproduced image) have been stronger. Even when both of the photographic print and the image file are output, it is natural that outputting of both of the photographic print and the image file should be performed by a simpler operation and with a high operation efficiency.

Specifically, a demand for the output of the photographic print and the image file has been recently stronger, and an apparatus capable of outputting a higher quality image with a higher efficiency and having a more excellent performance has been demanded.

SUMMARY OF THE INVENITON

The object of the present invention is to solve the problems of the foregoing prior art, and to provide an image processing method and an image processing apparatus which make it possible to output both of the photographic print and the image file having a good image quality by a simple operation and with a high operation efficiency.

In order to attain the object described above, the first aspect of the present invention provides an image processing method in which an original image is read photoelectrically to obtain input image data, and the thus obtained input image data is subjected to image processing to obtain output image data, comprising the steps of: performing first conversion for outputting an image file and second conversion for outputting a print as the image processing on the input image data obtained by a single image reading operation; and outputting first image data for outputting the image file and second image data for outputting the print.

Preferably, a resolution of the single image reading operation is set in accordance with output information of the print and the image file.

Preferably, the single image reading operation is performed with a resolution corresponding to one of sizes of the image file and the print to be output.

Preferably, the single image reading operation is performed with a resolution corresponding to a larger number of pixels required for outputting the image file or the print in accordance with the sizes of the image file and the print to be output.

Preferably, at least one of the first conversion for outputting the image file and the second conversion for outputting the print includes an output color conversion, or the output color conversion and an image format conversion as the image processing.

Preferably, the image format conversion selects presence or absence of an image compression, and wherein, when the image compression is performed, the image format conversion also selects presence or absence of a change of compression ratios.

Preferably, the first conversion for outputting the image file and the second conversion for outputting the print comprise respective sharpness processing as the image processing, and wherein at least one of a method and an intensity of the sharpness processing is changed in accordance with the first conversion for outputting the image file and the second conversion for outputting the print.

Preferably, same processing to be conducted in the first conversion for outputting the image file and the second conversion for outputting the print as the image processing is conducted in common as common processing in both of the first and second conversions.

In order to attain the object described above, the second aspect of the present invention provides an image processing apparatus that reads an original image photoelectrically to obtain an input image data which is then subjected to image processing to obtain output image data, comprising: a file converting unit for converting the input image data to first image data for outputting an image file; a print converting unit for converting the input image data to second image data for outputting a print; and a switching unit for performing switching operations among a first conversion of the input image data only by the file converting unit wherein the input image data is obtained by a single image reading operation, a second conversion of the input image data only by the print converting unit wherein the input image data is obtained by the single image reading operation, and both of the first and second a conversion of the input image data by both of the file converting unit and the print converting unit wherein the image data is obtained by the single image reading operation.

Preferably, a resolution of the single image reading operation is set in accordance with output information of the print and the image file.

Preferably, the single image reading operation is performed with a resolution corresponding to one of sizes of the file and the print to be output.

Preferably, the single image reading operation is performed with a resolution corresponding to a larger number of pixels required for outputting the image file or the print in accordance with the sizes of the image file and the print to be output.

Preferably, at least one of the file converting unit and the print converting unit includes an output color converting unit, or both the output color conversion and an image format converting unit.

Preferably, the image format converting unit selects presence or absence of an image compression, and wherein, when the image compression is performed, the image format converting unit also selects a change of compression ratios.

Preferably, the file converting unit and the print converting unit perform respective sharpness processing in which at least one of a sharpness processing method and a sharpness intensity is different in accordance with the file converting unit and the print converting unit.

Preferably, the file converting unit and the print converting unit have in common a common processing unit which performs same processing.

In order to attain the object described above, the third aspect of the present invention provides an image processing method in which input image data obtained from an original image is subjected to image processing to obtain output image data, comprising the steps of: converting the input image data obtained by a single image reading operation to obtain two or more types of output image data which have different data formats from each other; and outputting the thus obtained two or more types of output image data as the output image data.

Preferably, the two or more types of output image data are two types including first output image data and second output image data.

Preferably, the first output image data is for outputting a print and the second output image data for outputting an image file.

In order to attain the object described above, the fourth aspect of the present invention provides an image processing apparatus in which input image data obtained by photoelectrically reading an original image is subjected to image processing to obtain output image data, comprising: a converting section for converting the input image data obtained by a single image reading operation to two or more types of output image data having different data formats from each other; and a switching unit for performing switching operations to select a conversion process to be used in the converting section in accordance with at least one type of output image data in the two or more types of output image data having different data formats from each other which are outputted from the converting section.

Preferably, the converting section includes: a first converting unit for converting the input image data to first output image data; and a second converting unit for converting the input image data to second output image data which has a different data format from the first output image data; and switching operations are performed in the switching unit among a first conversion of the input image data obtained by a single image reading operation only with the first converting unit, a second conversion of the input image data only with the second converting unit, and a third conversion of the input image data with both of the first and second converting units.

Preferably, the first converting unit is a converting unit for a print and the first output image data is for outputting the print, and wherein the second converting unit is a converting unit for an image file and the second output image data is for outputting the image file.

DETAILED DESCRIPTION OF THE PREFERRED EMBODIMENTS

The image processing method of the invention and the image processing apparatus of the invention for implementing the image processing method are described in detail with reference to the preferred embodiments shown in the accompanying drawings.

Figure 1:
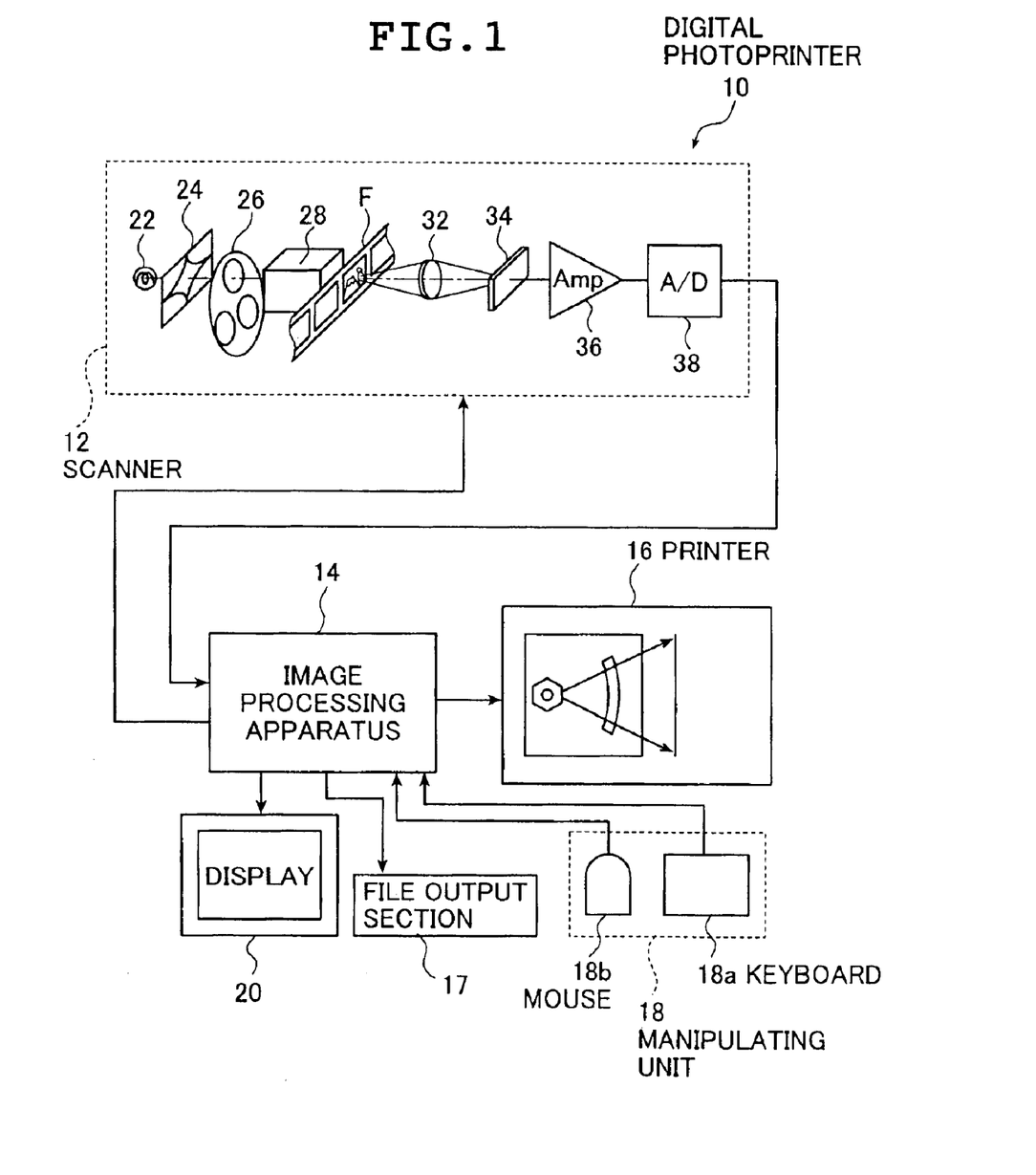
FIG. 1 is a block diagram showing an embodiment of a digital photoprinter using the present invention.

FIG. 1 shows a block diagram for an embodiment of a digital photoprinter using the image processing apparatus of the invention which implements the image processing method of the invention.

The digital photoprinter (hereinafter simply referred to as a photoprinter) denoted by reference numeral 10 in FIG. 1 comprises a scanner (image reading apparatus) 12; an image processing apparatus 14; a printer (image printing/developing apparatus) 16; and a file output section 17.

The image processing apparatus 14 is connected to a manipulating unit 18 having a keyboard 18a and a mouse 18b, and a display 20 for displaying a simulation image for use in a certification as well as for instructing an operation by GUI. The keyboard 18a and the mouse 18b are used for entering (setting) various instructions concerning an output method, which includes a method in which a photographic print alone is output, a method in which an image file alone is output and a method in which both of them are output, as well as concerning sizes of the photographic print (hereinafter referred to as "print") and an image file. The keyboard 18a and the mouse 18b are used also for entering instructions to select a specific image processing and to perform the selected image processing, and to perform a color/density correction.

The scanner 12 is an apparatus for reading out the images captured on the film F one frame by one frame photoelectrically, which comprises: a light source 22 for emitting a white light; a variable diaphragm 24; a color filter plate 26; a diffusion box 28 for making a reading light incident onto the film F uniform in the surface direction of the film F; an image forming lens unit 32; an area CCD sensor 34 (hereinafter referred to as "CCD sensor"); an amplifier 36; and an analog/digital (A/D) converter 38 (hereinafter referred to as "A/D converter").

In the photoprinter 10, an exclusive carrier is prepared, which is freely detachable to the body of the scanner depending on a film size used in Advanced Photo System and a film size such as 135 size. By replacing the carrier with another, the photoprinter 10 copes with various films and processing. The image (frame) captured on the film and used for the print preparation is transported to a predetermined reading position by the carrier and held there.

In the scanner 12 constituted as described above, the image captured on the film F is read out, a reading light emitted from the light source 22 is adjusted in its light quantity by the variable diaphragm 24, and then allowed to be incident onto the color filter plate 26 to undergo a light adjustment. The reading light travels to the diffusion box 28 to be diffused thereby. Thereafter, the diffused light is made to be incident onto the film F held at the predetermined reading position by the carrier, and then transmits through the film F. Thus, a projection light bearing the image captured on the film F is obtained.

The image borne on the projection light is imaged on a light receiving plane of the CCD sensor 34 by the image forming lens unit 32, and the image captured on the film F is read out photoelectrically.

An output signal from the CCD sensor 34 is amplified by the amplifier 36, and converted to a digital signal by the A/D converter 38 to be sent to the image processing apparatus 14.

The color filter plate 26 is a turret having R (red), G (green) and B (blue) color filers. The color filter plate 26 is rotated by rotation means (not shown), and inserts each color filter thereof in an optical path of the reading light.

In the scanner 12 shown in FIG. 1, each color filter of the color filter plate 26 is sequentially inserted in the optical path. By carrying out reading-out operations three times, the image captured on the film F is divided into three primaries of R, G and B, and then read out.

The scanner 12 carries out the reading-out operations for the image captured on the film F twice: one is a prescan for reading out with a low resolution; and the other is a fine scan for obtaining image data corresponding to the outputs of the print and the image file.

The prescan is performed under reading-out conditions of itself, which are set in advance, in order to make it possible for the CCD sensor 34 to read out all of the images of the film F to be scanned by the scanner 12 without any saturation. On the other hand, the fine scan is performed under reading-out conditions of itself, which are set for each frame based on prescan data.

Accordingly, output signals obtained by the prescan and the fine scan show basically the same data except that a resolution of the image reading and an output level between the prescan and the fine scan are different from each other.

Here, in the photoprinter 10 according to the present invention, the resolution in the fine scan is appropriately set depending on output information of the print and the image file in response to an order of a customer, more specifically, depending on sizes of the print and the image file. Description in this regard will be made later.

In the present invention, the single image reading operation is an image reading operation for obtaining the input image data for use in outputting the print and the image file and, therefore, this means the fine scan in the present invention.

The scanner 12 for reading out the image is not limited to the one shown in FIG. 1, and various kinds of known scanners are available.

For example, the scanner 12 may be the one, which divides the image into three primaries by use of light sources composed of LEDs for individually emitting reading lights of three primaries and reads out the three primaries. Alternatively, the scanner 12 may be the one which reads out the image by a slit scanning exposure using three color line CCD sensors.

In addition to the image data from the scanner which reads out the image on the film photoelectrically, the photoprinter 10 (image processing apparatus 14) according to the present invention may receive and process image data (image file) from various kinds of image data supply sources such as an image reading apparatus for a reflection original, an image pickup unit connecting to a digital camera and the like, communication means including internet, a computer communication network and the like, and a recording medium (drive thereof) for the image data including a floppy disk and the like. Further, it is preferable that a drive of a recording medium or communication means connecting to the communication network functioning as an image data supply source is preliminarily provided in the file output section 17 and allowed to serve as an input/output section of the image file. On this occasion, in the photoprinter 10, the scanner 12, the image processing apparatus 14 and the file output section 17 function as an input apparatus while the printer 16, functioning as an output apparatus, receives output image data from the input apparatus (image processing apparatus 14).

As described above, the output signal (image data) from the scanner 12 is output to the image processing apparatus 14.

Figure 2:
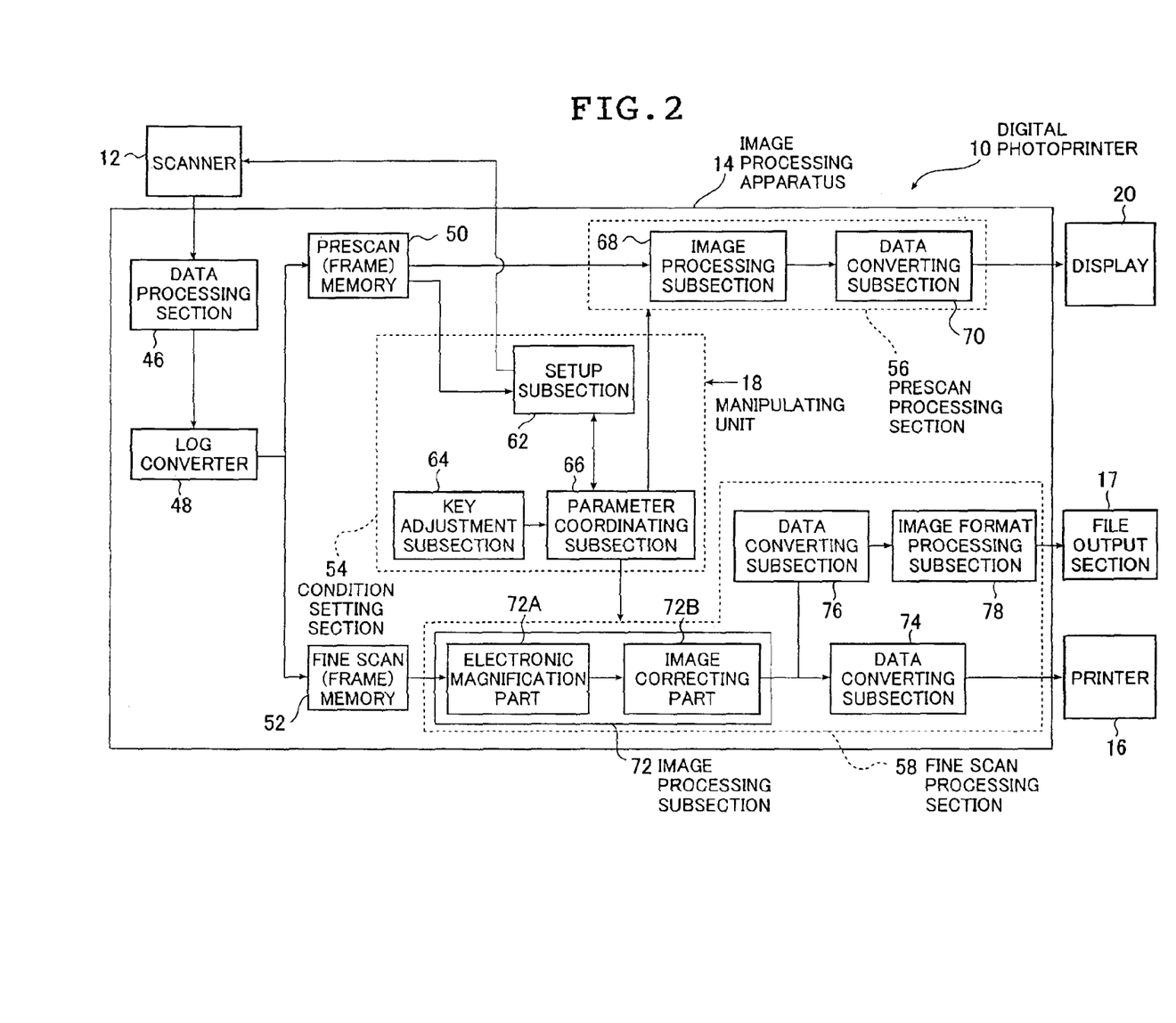
FIG. 2 is a block diagram showing an embodiment of an image processing apparatus of the digital photoprinter shown in FIG. 1.

A block diagram of the image processing apparatus 14 is shown in FIG. 2. As shown in FIG. 2, the image processing apparatus 14 (hereinafter referred to as "processing apparatus 14") comprises: a data processing section 46; a Log converter 48; a prescan (frame) memory 50; a fine scan (frame) memory 52, a condition setting section 54; a prescan processing section 56; and a fine scan processing section 58.

Although FIG. 2 shows portions which principally perform the image processing operations, the processing apparatus 14 controls and manages the operation of each portion in response to an output method entered, which includes a method in which a photographic print alone is output, a method in which an image file alone is output and a method in which both of them are output. In other words, the image processing apparatus 14 controls and manages the whole of the photoprinter 10. Accordingly, a CPU for controlling the whole of the photoprinter 10, a memory storing necessary information for the operation of the photoprinter 10 and the like are also arranged except for the portions shown in FIG. 2.

The data processing section 46 is a portion for performing predetermined processing such as a DC offset correction, a dark correction, a shading correction and the like for output data of R, G and B, which are output from the scanner 12.

The LOG converter 48 performs a LOG conversion for the output data processed by the data processing section 46 by means of a look-up table (LUT) and the like, thus obtaining digital image (density) data. The prescan (image) data converted by the TOG converter 48 is stored in the prescan memory 50, and the fine scan (image) data converted by the LOG converter 48 is stored in the fine scan memory 52.

The condition setting section 54 comprises a setup subsection 62, a key adjustment subsection 64 and a parameter coordinating subsection 66.

The setup subsection 62 is a portion for setting reading-out conditions and image processing conditions in the fine scan for each frame in accordance with image analysis results using prescan data and in accordance with output information supplied from the manipulating unit 18.

To be specific, the setup subsection 62 prepares a density histogram of the image by use of the prescan data, and calculates an image characteristic quantity such as a minimum density, a maximum density and an average density.

Subsequently, to saturate the CCD sensor 34 at a density somewhat lower than the minimum density of the image (frame), the setup subsection 62 determines the reading-out conditions of the fine scan including a stop-down value of the variable diaphragm 24 and a storage time of the CCD sensor 34 by use of the density histogram and the image characteristic quantity. Furthermore, the setup subsection 62 sets a resolution of the fine scan, depending on sizes of the print and image file to be output, and outputs an instruction to the scanner 12.

To cope with the output method entered, when either the print or the image file is output, the resolution of the fine scan is set to a value in accordance with a size of one of the print and the image file to be output, that is, the number of pixels required to output one of the print and the image file. When both of the print and the image file are output, the resolution is, for example, set to a value corresponding to a larger one of the sizes of the print and the image file. Note that the resolution of the fine scan in accordance with the sizes of the print and the image file is previously set depending on characteristics of the apparatus.

A resolution in the image reading-out operation may be adjusted by means of known methods such as a data thinning, a pixel shifting for the CCD sensors 34 and a optical magnification adjustment in the scanner 12. Furthermore, it is natural that the resolution and output size in the image reading-out operation need not be equal perfectly to those in the fine scan.

By use of the calculated density histogram and image characteristic quantity, the resolution in the image reading-out, and the output size, the setup subsection 62 sets various processing conditions in image processing subsections 68 and 72 to be described later. Specifically, the setup subsection 62 sets a sharpness gain and various look-up tables (LUT). Note that the various processing conditions in response to the image analysis are satisfactorily set by known methods.

The key adjustment subsection 64 calculates an adjustment quantity of the image depending on various adjustments instructions and the like entered by various adjustment keys such as a density adjustment key provided in the keyboard 18a and the manipulating unit 18, and supplies the calculated adjustment quantity to the parameter coordinating subsection 66.

The parameter coordinating subsection 66 receives the various types of processing conditions set by the setup subsection 62, and sets the various processing conditions at predetermined positions of the prescan processing section 56 and the fine scan processing section 58. The parameter coordinating subsection 66 adjusts (corrects) image processing conditions set in each portion of the prescan and fine scan processing sections 56 and 58, prepares the processing conditions for performing the adjustment, and sets the processing conditions for both of the prescan and fine scan processing sections 56 and 58.

In the image processing apparatus 14, the prescan data stored in the prescan memory 50 is processed in the prescan processing section 56, and the fine scan data stored in the fine scan memory 52 is processed in the fine scan processing section 58.

The prescan processing section 56 comprises an image processing subsection 68 and a data converting subsection 70, while the fine scan processing section 58 comprises an image processing subsection 72, data converting subsections 74 and 76, and an image format processing subsection 78.

The image processing subsection 68 of the prescan processing section 56 and the image processing subsection 72 of the fine scan processing section 58 have the same constitution basically except that pixel densities of the image data to be processed are different from each other between the subsections 68 and 72, and perform the same processing operation.

Accordingly, the process by the image processing subsection 72 of the fine scan processing section 58 will be described below as the representative of them.

In FIG. 2, the image processing subsection 72(68) is a portion which performs various image processing by means of known methods using various filter processing such as a look-up table (LUT), a matrix arithmetic and a low pass filter. The image processing subsection 72(68) has an electronic magnification part 72A and an image correcting part 72B.

The electronic magnification part 72A reads out the image data stored in the fine scan memory 52 (prescan memory 50), and performs the electronic magnification processing for the image data read out. An electronic magnification rate is set in advance according to the resolution of the reading-out in the scanner 12 and the output sizes of the print and the image file. However, the present invention is not limited to this, and the electronic magnification rate may be set appropriately, for example, by a calculation of the setup subsection 62. A method of the electronic magnification is not limited, and the electronic magnification is satisfactorily performed by known methods such as interpolation and thinning of the image data.

The image correcting part 72B is a portion which performs various image processing operations for the image data having a size (pixel number) adjusted by the electronic magnification processing, which include a color balance correction, a density correction, a gradation correction, a chroma correction, a dodging processing and a sharpening processing. Note that the dodging processing means a process in which a quantity of light is reduced averagely by a density mask held in an exposure path when the print is being made from a negative.

In the present invention, the resolution and electronic magnification rate in the fine scan and the output sizes of the print and the image file may be different depending on kinds of the films including 135 size, Brownie size and IX240 (in Advanced Photo System).

With respect to the image data that has been subjected to the image processing in the above described manner, the prescan data is sent to the data converting subsection 70, and the fine scan data is sent to at least one of the data converting subsection 74 and the data converting subsection 76.

By use of a three dimensional (3D)-LUT, each data converting subsection performs a conversion of the image data at a region where the image data is converted to another image data corresponding to a color space of the output destination. Specifically, the data converting subsection 70 converts the prescan data to image data corresponding to displaying by the display 20. The data converting subsection 74 converts the fine scan data to output image data, through output color conversion processing, corresponding to an image recording by the printer 16. Further, the data converting subsection 76 converts the fine scan data to output image data, through the output color conversion processing, corresponding to an output as an image file.

The image data that has been processed in the data converting subsection 70 of the prescan processing section 56 is sent to the display 20. While, the image data that has been processed in the data converting subsection 74 of the fine scan processing section 58 is sent to the printer 16. The image data that has been processed in the data converting subsection 76 of the fine scan processing section 58 is sent to the file output section 17 via the image format processing subsection 78.

The display 20 is not limited to a specified unit, and various known display means such as a Cathode Ray Tube (CRT) and a liquid crystal display are available.

The printer 16 records a latent image by exposing a photosensitive material (photographic paper) thereon in accordance with the image data output from the fine scan processing section 56(58), and performs a developing process in accordance with the photosensitive material, thus outputting a finished print.

For example, the printer 16 cuts the photosensitive material to a predetermined length in accordance with the print. Thereafter, according to the image data (recorded image), the printer 16 modulates a light beam in accordance with a record of a backside printing and spectral sensitivity characteristics of the photosensitive material (photographic paper), and polarizes the modulated light beam in a fine scan direction. Then, the printer 16 transports the photosensitive material in a sub-scan direction perpendicular to the fine scan direction, thus recording the latent image on the photosensitive material. The printer 16 performs a predetermined wet developing process including color development, bleach-fix and washing for the photosensitive material on which the latent image is recorded, and dries the photosensitive material to obtain a print. Then, the printer 16 sorts the prints to pile up them.

The image format processing subsection 78 is a portion which processes the image data converted by the data converting subsection 76 so as to correspond to the image file and obtains the image data subjected to an image format processing.

In the present invention, the image format is not limited to specified one, and various known image formats such as Flash Pix, JPEG, JPEG (Exif), JPEG2000 and bit map data are available. Processing for performing the image format for the image data is also performed satisfactorily in accordance with the image format by known methods.

An image format processing subsection may be provided also between the printer 16 and the data converting subsection 74 corresponding to the output of the print according to needs.

For example, when the image data for use in the print output, which has been subjected to the conversion by the data converting subsection 74, is supplied to (single or plural units of) the printer 16 by use of a communication network and the like, the image data should be subjected to the image format processing more advantageously for reasons of a transfer speed, an effective utilization of infrastructures and availability of low capability infrastructures. With this constitution, when the image format processing needs not to be performed, the output image data may be supplied intact to the printer 16 without passing through the image format processing subsection.

Here, in the present invention, the image format may be the same for all frames, or the image format may be different for each frame depending on an instruction entered by an operator in response to a request of a customer. Alternatively, the image format may be different for each film, or the image format may be selected freely from these ways.

In the present invention, a compression may be performed in the image format processing subsection 78 and the image format processing subsection connected to the data converting subsection 74, and it may be decided whether there is necessity to perform the image compression or not.

When the compression is performed, a compression ratio may be uniform. Moreover, the different compression ratio may be set depending on the image format. The compression ratio may be changed arbitrarily in accordance with an instruction entered by an operator in response to a request of a customer. Furthermore, one of these compression ratios may be section by selection. The compression ratio may be varied so as to be optimized depending on an image, for example, depending on a busy scene that is a scene where the image changes much and a scene in which the image does not change much.

The used image format and compression ratio may be set such that the image format and the compression ratio can be optimized in accordance with output destinations of the image data such as the file output section 17, the printer 16, the network and the like or may be set so as to be of different values in respective image format subsections.

Specifically, in the image format processing subsection 78, an image formation conversion optimal for the file output is performed, or further a compression is performed. When the image format processing subsection is connected to the data converting subsection 74, an image format conversion optimal for the print output may be performed therein, or a compression may be performed therein.

The image data that has been subjected to the image format processing by the image format processing subsection 78 is output to the file output section 17.

The file output section 17, being a site for recording (outputting) the image data as an image file on a recording medium of the image data, comprises a drive of the recording medium. Further, the file output section 17 may be imparted with a function (communicating means) for distributing the output image data as the image file via the communication network such as internet and the like, a function for transmitting such output image data so that it is represented on an outside display (not shown) having a high resolution or a function for transmitting such output image data to other types (for example, different in color reproducing space) of printers (not shown). In accordance with the above description, it goes without saying that the file output section 17 may be imparted with a function (drive, communication means) for capturing the input image data as an image file.

Further, kinds of the recording mediums used in the present invention are not limited in any particular way, and various known recording mediums such as CD-Rs, MOs, smart media, mini disks (MDs), Zips and floppy disks are available. Furthermore, the image file may be output from selected one of the plurality of recording mediums. The image file recorded on one recording medium may be one frame, plural frames, one case and plural cases. These may be arbitrarily selected.

An image file name in outputting the image file should be automatically determined by use of order information, a customer ID, a print dealer (laboratory shop) ID, a frame number, date of order, date of photographing, a sort of a camera photographing the image, a sort of a film and the like. Alternatively, an operator should determine the image file name.

Here, a viewer which can read an image format of the image file should be installed in the recording medium on which the image file is recorded.

Furthermore, a print which reproduced the image of the image file may be adhered to the recording medium on which the image file is recorded. The print should be the one from which contents of the image recorded on the recording medium can be easily seen. For example, the print with indexes is preferable.

Various templates of sizes (resolutions) in accordance with the image file (image data) in addition to the image file should also be recorded in the recording medium. Thus, it is possible to easily synthesize the template with the image in reproducing the image from the image file, resulting in an increase of amusement. As the templates, a frame surrounding the image, various characters and a character frame are exemplified.

Such templates (image data) are stored, for example, in the image processing apparatus 14 in advance, and satisfactorily supplied either by an instruction of an operator or automatically to the file output section 17 to be recorded in the recording medium. At this time, according to needs, a size of each template (image data) is automatically converted (electronic-magnified) satisfactorily in accordance with the image file to be output.

In the present invention, when both of the print and the image file are output, identification information for allowing the print and the recording medium to form a one-to-one correspondence, for example, a cartridge ID of an Advanced Photo System and the like, should be recorded in the recording medium. Thus, a customer can put the image files in order and effectively use them more. The identification information may be recorded in the recording medium by known methods such as direct writing and label adhesion, satisfactorily. Furthermore, the identification information may be recorded in a bar-coded fashion.

When both of the print and the image file are output, the image file name should be recorded in the print. It is satisfactory that, for example, backside printing of the print may be used for recording the image file name. Recording may be performed either on each print or on an index print, or both of them may be adopted.

The index print and the image file thereof may be output in addition to the print output and the file output. At this time, when both are output, a file name of the image file should be recorded in the index print (both of the front and back sides will do).

The index image may be prepared from any of the fine scan data and the prescan data.

In the present invention, the numbers of the file output section (file output means) and the printer (print output means) are not respectively limited to one (single system), and at least one of them may be plural.

When both of the file output section (file output means) and the printer (print output means) are respectively plural, one system of the file output section and ore system of the printer should be set to be arbitrarily switchable to each other according to needs. This switch may be performed in accordance with a demand from the output destination or a switching operation by an operator.

The present invention will be described below in more detail by explaining an action of the photoprinter 10.

A carrier fit for the film F is equipped at a predetermined position of the scanner 12, and the film F is loaded on the carrier.

Subsequently, an output method for outputting the print and the image file in kinds of the following manners is selected in accordance with an order from a customer. Specifically, the print alone is output, the image file alone is output, and both the print and the image file are output. Further, sizes of the print and the image file are selected. Then, these data as output information are entered to the image processing apparatus 14 by use of the manipulating unit 18. In this embodiment, it is assumed as an example that the output method in which both the print and the image file are output is selected, but an L size is selected as the size of the print, and that a size equivalent to 4BASE, for example, 1524 pixels×1074 pixels, is selected as the size of the image file. Furthermore, other necessary information such as the number of the prints is input to the image processing apparatus 14.

These pieces of information are sent to the predetermined portions of the photoprinter 10, respectively.

Various methods for inputting the output information including the output method and the output size are available without being limited to the input by the operator.

For example, in the case of the Advanced Photo System, the information may be input by use of a magnetic recording medium of the film. Alternatively, the output information is optically recorded onto the film in advance, and then may be read out by the carrier or the like to be input. Furthermore, an IC and the like are fitted to a cartridge, and the output information is recorded thereinto. Then, the output information may be read out to be input. Furthermore, the output information may be input by use of communication means such as a computer communication network.

Recording of the output information onto the magnetic recording medium may be performed by the customer or the operator according to an order from the customer.

The size of the image file may be invariable, and a plurality of sizes of the image files, for example, BASE (512 pixels×768 pixels), 4BASE (1024 pixels×1536 pixels) and 16BASE (2048 pixels×3072 pixels), may be selectively set. Alternatively, the size of the image file may be set to any value freely, or the size of the image file may be selected randomly.

Also the size of the image file should be set for each frame or for each case similarly to the size of the print.

An output method should be selectable for each frame or for each case.

After completion of the necessary manipulation, that is, the input (setting) of the information, the operator instructs the photoprinter 10 to start a preparation of the print.

Thus, a stop-down value of the variable diaphragm 24 of the scanner 12 is set in accordance with reading-out conditions of the prescan, and thereafter, the carrier 30 transports a frame of the film F used for the image reading to a predetermined reading position, and an image produced from a projection light onto the film F is formed in the CCD sensor 34 to be read out. The image processing apparatus 14 performs such image reading by sequentially inserting the R, G and B color filters of the color filter plate 26 into the optical path with rotation of the color filter plate 26. Thus, one frame of the image on the film F is separated into the three primaries R, G and B to be read out photoelectrically.

The prescan and the fine scan may be performed one frame by one frame, or the prescan and the fine scan may be performed for all frames or for the predetermined number of frames continuously. A case where the prescan and the fine scan are Performed one frame by one frame will be described below.

An output from the CCD sensor 34 is amplified by the amplifier 36, and converted to a digital signal by the A/D converter 38 to be sent to the image processing apparatus 14. The digital signal sent to the image processing apparatus 14 undergoes a predetermined processing such as an offset correction by the data processing section 46 in the image processing apparatus 14, and then undergoes a conversion processing by the Log converter 48 to be converted to digital image data. The digital image data is stored as prescan data in the prescan memory 50.

When the prescan data is stored in the prescan memory 50, the setup subsection 62 of the prescan processing section 54 reads out the prescan data, and prepares the density histogram and calculates the image characteristic quantity as described above.

Subsequently, the setup subsection 62 compares an output size of the print with that of the image file, that is, the number of pixels required to output one of the print and the image file as described above, and sets a resolution of the fine scan in accordance with one having a larger size of the print and the image file. Further, the setup subsection 62 sets reading-out conditions of the fine scan such as a stop-down value of the variable diaphragm 24 as described above, and sends both of the resolution and the reading-out conditions to the scanner 12. In this embodiment, a 4BASE has a size larger than that of an L size, and the resolution of the fine scan is set depending on the image file.

The setup subsection 62 further calculates processing conditions for the image processing depending on the density histogram, the image characteristic quantity and an instruction by an operator, and sends the processing conditions to the parameter coordinating subsection 66. The parameter coordinating subsection 66(76) sets the calculated image processing conditions at predetermined positions of the prescan processing section 56 and the fine scan processing section 58.

In the case where the certification is performed, when the image processing conditions are set in the prescan processing section 56 by the parameter coordinating subsection 76, the prescan data is read out from the prescan memory 50, and the prescan data is processed by the image processing subsection 68. Subsequently, the prescan data is converted to the image data by the data converting subsection 70, and is represented as the finished simulation image on the display 20. Note that the simulation image to be represented on the display 20 may be prepared from the fine scan data not from the prescan data, and the simulation image may be prepared by thinning the fine scan data if necessary.

An operator watches the display 20, and confirms (certifies) the image. The operator performs a color adjustment, a density adjustment and a gradation adjustment by use of the adjustment keys set in the keyboard 18a according to needs.

A signal of the adjustment is sent to the key adjustment subsection 64. The key adjustment subsection 64 calculates a correction quantity of the image processing condition in response to an input, and sends the correction quantity to the parameter coordinating subsection 66. The parameter coordinating subsection 66 corrects the image processing conditions set in the processing subsections 68 and 72 in accordance with the correction quantity sent thereto. Accordingly, also an image represented on the display 20 changes in response to the input by the operator.

When the operator decides that the image represented on the display 20 is proper, that is, when the certification result is proper, the operator gives an instruction to the effect that the image represented on the display 20 is proper, to the scanner 12 by use of the keyboard 18a and the like. Thus, processing performed for the frame (image) is fixed.

If the scanner 12 is set to the resolution and the reading-out conditions set by the setup subsection 62 as described above, the fine scan is started by the instruction indicating that the certification result is proper. Here, the resolution of the fine scan is set in accordance with the image file having a larger output size similarly to the above description. On the contrary, when the print has a larger size than that of the image file, the resolution of the fine scan is set in accordance with the print.

When the certification is not performed, the processing is fixed at the time when the setting of the image processing condition to the fine scan processing section 56 by the parameter coordination subsection 76 is completed, and then the fine scan is started.

The fine scan is performed in the same manner as that of the prescan other than the resolution and the reading-out condition differ from those of the prescan, and an output signal from the CCD sensor 34 is processed by the amplifier 36 and the A/D converter 38. Then, the output signal from the CCD sensor 34 is processed by the data processing section 48(46) of the image processing apparatus 14, and then converted to fine scan data by the Log converter 50(48) to be sent to the fine scan memory 52.

When the fine scan data is sent to the fine scan memory 52, first, an output of the image file having a larger output size is performed. Specifically, the fine scan data is read out by the fine scan processing section 58, and first subjected to an electronic magnification processing by the electronic magnification part 72A of the image processing subsection 72 to be converted to image data equivalent to the foregoing 4BASE. Here, in this embodiment, since the resolution of the fine scan is set in accordance with the size of the image file, the electronic magnification of the fine scan data in outputting the image file is performed at an ordinary scale conversion rate.

The fine scan data that has been subjected to the electronic magnification processing by the electronic magnification part 72A is processed under the preset image processing conditions by the image correcting part 72B.

The fine scan data processed by the image processing subsection 72 (image correction processing part 72B) is sent to the data converting subsection 76 corresponding to the output of the image file, and subjected to output color conversion to produce image data corresponding to the image file. Thereafter, the image data is sent to the image format processing subsection 78, and converted to image data of a predetermined image format, for example, a JPEG format, to be supplied to the file output section 17.

The image data is recorded, for example, in CD-R, in the file output section 17, and is output as an image file.

When the output of the image file is completed, the fine scan data is read out from the fine scan memory 52 by the fine scan processing section 58 again, and then an output of the print is performed. Alternatively, the fine scan data can be read out from the fine scan memory 52 even during the processing for outputting the image file as long as reading-out is possible in terms of the apparatus. Specifically, according to the present invention, both of the print and the image file can be output by one fine scan, so that it is possible to secure a good operation efficiency.

The fine scan data is subjected to the electronic magnification processing by the electronic magnification part 72A of the image processing subsection 72 similarly to the above described manner. Here, in this embodiment, since the resolution of the fine scan is set in accordance with the size of the image file, the electronic magnification of the fine scan data in the print output is performed with a scale conversion rate (reduced more than usual in this embodiment) different from an ordinary one in accordance with the resolution and the print size, and the image data having a size corresponding to the print of an L size is produced. Accordingly, when the print has a larger size than that of the image file, an electronic magnification rate in outputting the print is ordinary, and an electronic magnification rate in outputting the image file differs from ordinary one.

Subsequently, the fine scan data that has been subjected to the electronic magnification processing by the scale conversion part 72A is processed under the preset image processing condition in the correction processing part 72B.

Since the size of the image data differs between the image file and the print in this embodiment, different LUT may be used in processing each of the image file and the print according to needs. Note that the processing condition as image processing is uniform in this embodiment.

Alternatively, since the electronic magnification rate differs from ordinary one, the electronic magnification rate may be optimized by changing the image processing parameter after the electronic magnification processing with the difference of the electronic magnification rate.

Subsequently, the fine scan data processed by the image processing subsection 72 (correction processing part 72B) is sent to the data converting subsection 74 corresponding to the output of the print, and converted to the image data co-responding to the image recording in the printer 16 to be output to the printer 16. Thus, the print obtained by reproducing the image data is prepared.

The image format processing section may be provided between the data converting subsection 74 and the printer 16 according to needs, similarly to the above descriptions.

In the above-described embodiment, though the image processing for outputting the print is performed after the image processing for outputting the file is first performed, the present invention is not limited to this, and the image processing for outputting the file may be performed after the image processing for outputting the print is first performed.

In this case, single image reading is performed by the scanner 12 in the input apparatus; subsequently, image processing is performed by the image processing apparatus 14; then, image transmission to the printer 16 as the output apparatus is performed; next, in the output apparatus, after the print output image data is received by the printer 16, paper exposure, paper development and the like are performed. Therefore, if all the print output image data can be received by the printer 16, the image file can be written in the recording medium by the file output section 17 of the input apparatus while paper exposure, paper development and the like are being performed thereby enabling to perform outputs of the file and print approximately at the same time. The above-described processing procedure, if arranged in accordance with the above description, can advantageously establish a favorable operation efficiency.

When only one of the outputs of the print and image file is performed, the print or the image file may be output based on the foregoing embodiment of the outputs of the print and image file.

At this time, it is natural that the resolution of the fine scan is set in accordance with the output sizes of the print and image file, the electronic magnification processing is performed at an ordinary electronic magnification rate.

In the present invention, the image data that is output as the image file is not limited to the image date (print image data) that has been subjected to the processingimilar to that for the print output, but the mage data (fine scan data) that has been subjected to only the electronic magnification processing and to no image processing in the correction processing part 72B will do. Alternatively, the prescan data will do. In this case, it does not matter whether or not the prescan data has been subjected to the image processing. Furthermore, this plurality of image data may be output as the image file.

Furthermore, when both of the print and the image file are output, contents of image processing may be different from each other in accordance with the print and the image file; for example, as described below, contents of sharpness processing may be changed to output respective image data appropriate for the print and the image file.

In the image processing apparatus 14 shown in FIG. 2, the correction processing part 72B is disposed in the down stream of the electronic magnification part 72A, that is a down stream in the flow direction of the image data. The correction processing part 72B performs processing alternately when both of the print and the image file are output. The present invention is not limited to this, and various constitutions are available.

Contrary to FIG. 2, the electronic magnification part 72A may be disposed, for example, in the down stream of the correction processing part 72B.

Figure 3A:
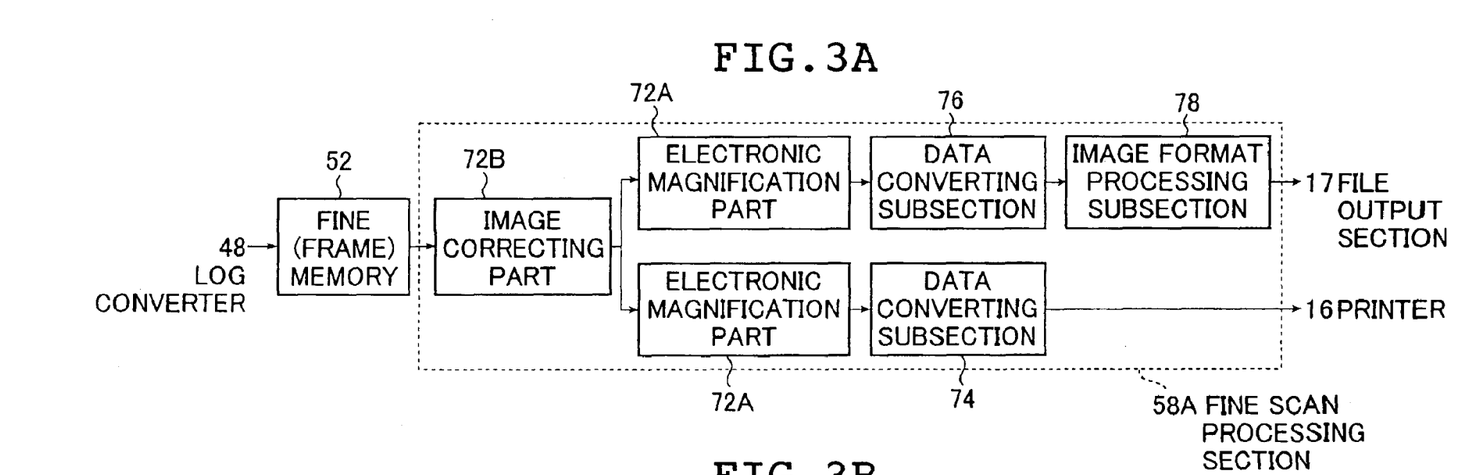
FIGS. 3A and 3B are block diagrams showing another embodiment of the image processing apparatus of the present invention.

Alternatively, like a fine scan processing section 58A shown in FIG. 3A, two electronic magnification parts 72A and 72A for the print and the image file may be disposed in the down stream of the correction processing part 72B.

Figure 3B:
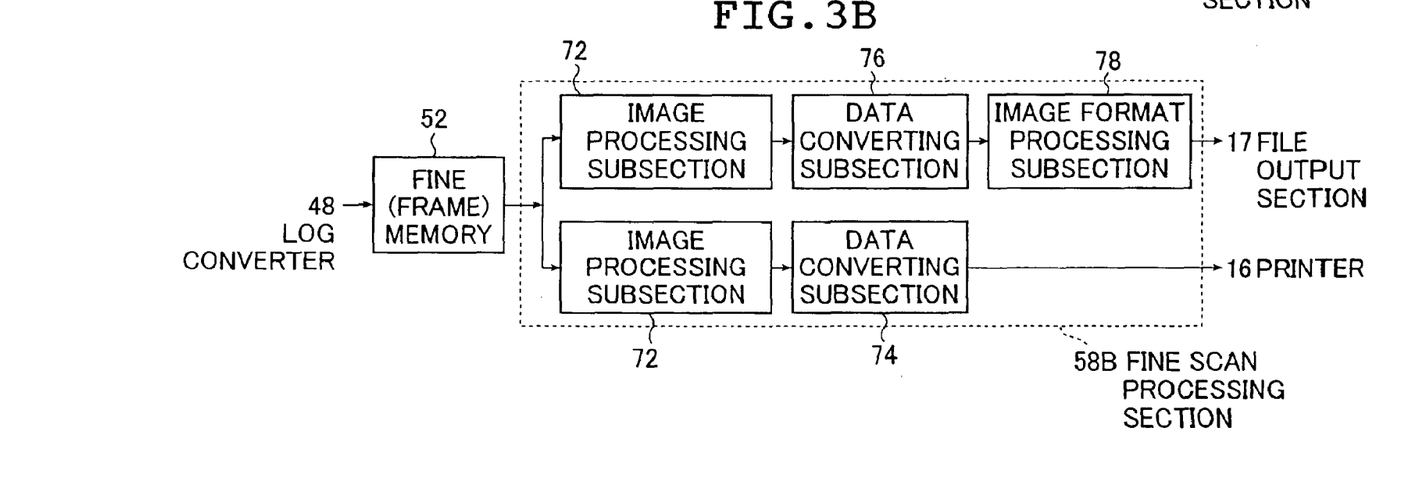

Furthermore, like a fine scan processing section 58B shown in FIG. 3B, a processing part composed of two systems, both of which are for the print and the image file and are parallel with each other, may be provided. Note that, also in this example, the electronic magnification part 72A may be disposed in any of the upper stream of the correction processing subsection 72 and the down stream thereof.

According to the example shown in FIGS. 3A and 3B, since an operation for outputting the print and an operation for outputting the image file are performed simultaneously so that the print and the image file can be output approximately simultaneously, it is possible to improve an operation efficiency.

In any of the constitutions, when the constitution is the one in which the electronic magnification part 72A is disposed in the down stream of the correction processing part 72B, the scale conversion processing is performed after the sharpness processing, and hence a definition of the image is sometimes deteriorated. Accordingly, an intensity of the sharpness should be set in consideration of the deterioration of the sharpness of the image.

Figure 4A:
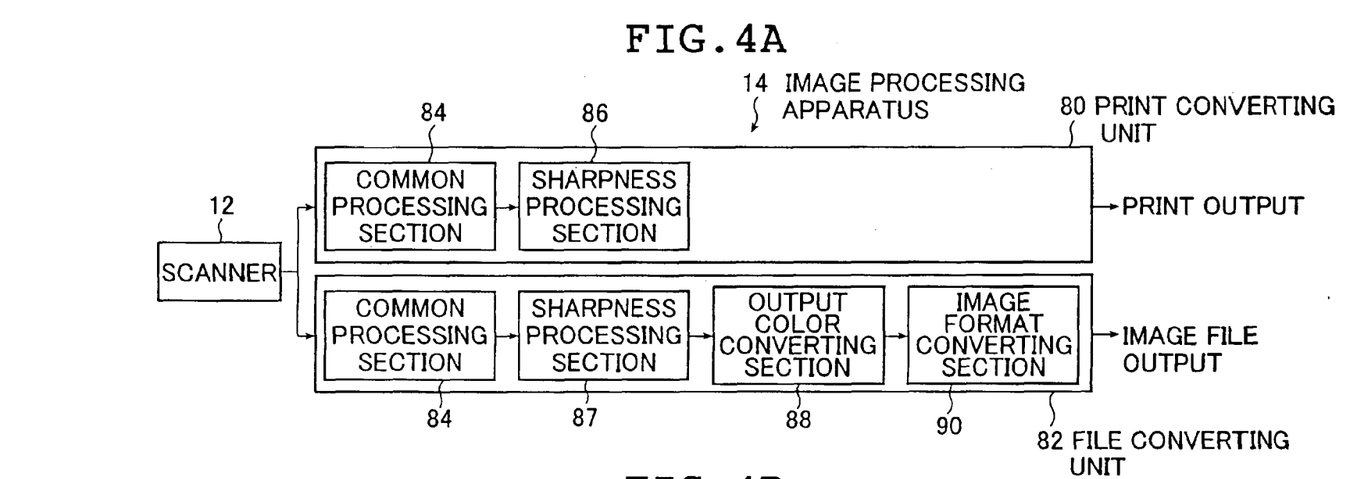
FIGS. 4A and 4B are block diagrams showing another embodiment of the image processing apparatus of the present invention.

While, as described above, when both the print output and the file output are performed, contents of image processing are changed therebetween and respective image data appropriate thereto may be output. Now, a case where, as contents of the image processing, as shown in FIG. 4A, at least any one of the method, intensity and the like of the sharpness processing may be changed to output the image data appropriate for respective outputs is explained below. In FIG. 4A, in order to clarify the characteristics of the present invention, components of the image processing apparatus 14 shown in FIG. 2, particularly, components of the fine scan processing section 58 are shown in a different denoting system.

In FIG. 4A, input image data obtained by a single image reading operation (scan) by the scanner 12 is supplied to a print converting unit 80 and a file converting unit 82 of the image processing apparatus 14. The print converting unit 80 comprises a common processing section 84 and a sharpness processing section 86 while the file converting unit 82 comprises the common processing section 84, a sharpness processing section 87, an output color converting section 88 and an image format converting section 90.

The common processing section 84 is a site where a common image processing is performed on an input image data from the scanner 12 by the print converting unit 80 and the file converting unit 82. Examples of common image processing to be performed to input image data in this common processing section 84 include respective processing of the data processing section 46, the Log converter 48, the fine scan memory 52, the electronic magnification part 72A of the image processing subsection 72 of the fine scan processing section 58, respective image processing except for sharpness processing of the image correcting part 72B of the image processing subsection 72 of the fine scan processing section 58, data conversion processing of the data converting subsection 74 for producing the image data for print and the like.

Further, the output color converting section 88, being a site for converting the image data for outputting the print of color space of the print into the image data for outputting the file of color space of the image file, has a function similar to that of the data converting subsection 76 as shown in FIG. 2.

The sharpness processing section 86 of the print converting unit 80 is a site for performing sharpness processing on the image data which has been processed by the common processing section 84 to output the image data for outputting the print. In this regard, an operation of performing sharpness processing on the image data is same as that in the sharpness processing section 87 of the file converting unit 82; however, the both are different from each other in that at least one of the method and intensity of the sharpness processing is different in accordance with the print converting unit 80 and the file converting unit 82. On the other hand, for example, the both can perform respective sharpness processing which are different from each other such that the sharpness processing section 86 can perform sharpness processing for suppressing graininess for outputting the print while the sharpness processing section 87 can perform unsharp mask (USM) processing for outputting the file. In another case, by enhancing the intensity to be conducted by the sharpness processing 86 more than that to be conducted by the sharpness processing 87, sharpness processing can be performed more strongly on the image data for outputting the print than on that for outputting the file.

Figure 4B:
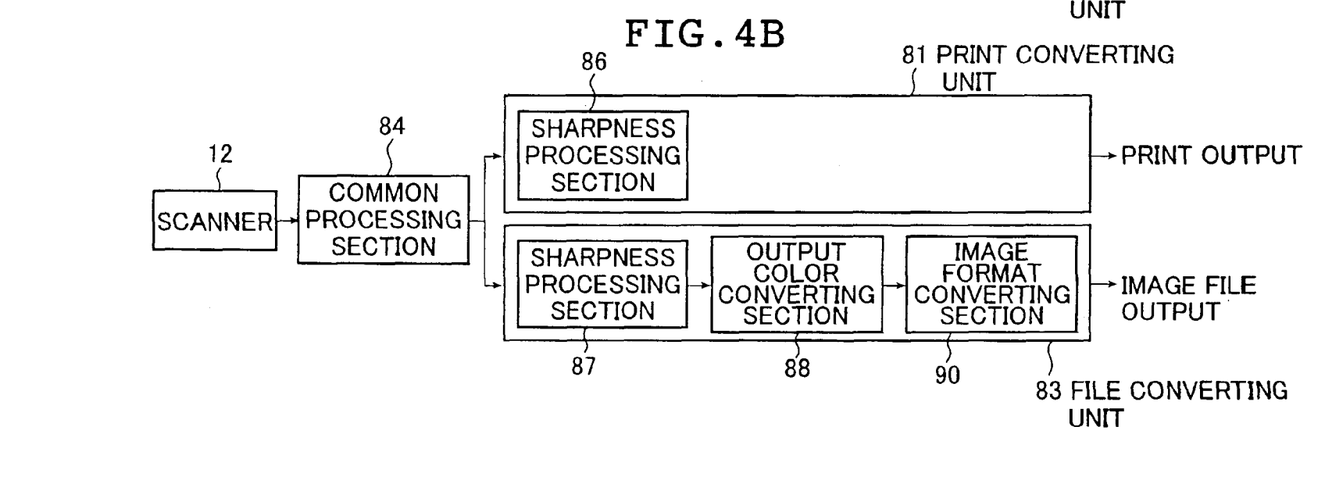

Further, in an embodiment shown in FIG. 4A, the print converting unit 80 and the file converting unit 82 are provided with the common processing section 84 respectively to perform the processing respectively. However, the present invention is not limited to the above embodiment, but, as shown in FIG. 4B, a print converting unit 81 and a file converting unit 83 may have one common processing section 84 in common and perform common processing on the input image data; in this case, sharpness processing is performed on the thus commonly processed image data in the sharpness processing section 86 of the print converting unit 81 to produce the image data for outputting the print while sharpness processing is performed on the thus commonly processed image data in the sharpness processing section 87 of the file converting unit 83 and subsequently respective processing is performed on the resultant image data in the output color converting section 88 and the image format converting section 90 therein to produce the image data for outputting the file. Further, in this case, respective processing in the sharpness processing section 86 and the sharpness processing section 87 may be same with or different from each other in terms of the method and intensity of sharpness processing.

Figure 5A:
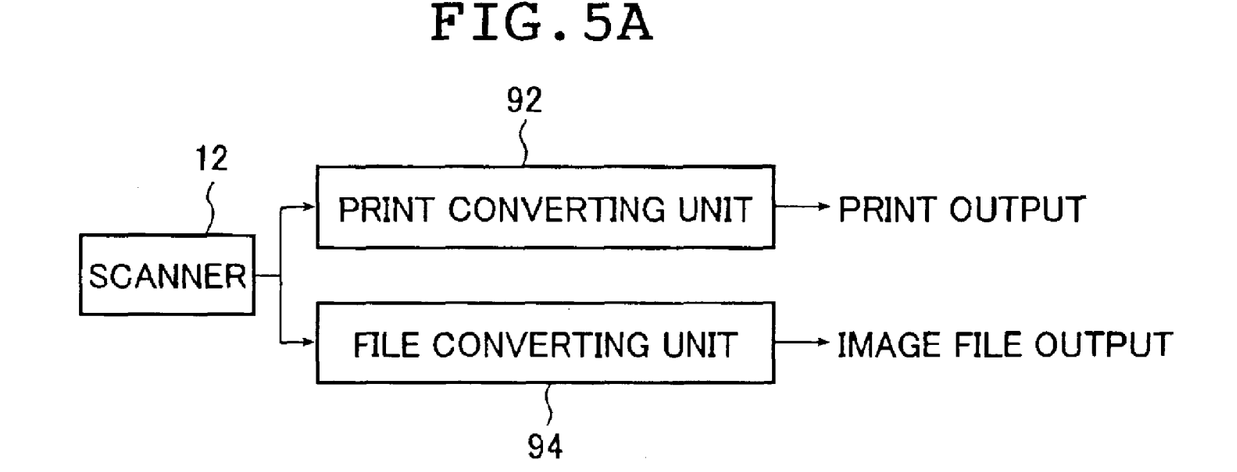
FIGS. 5A and 5B are block diagrams showing another embodiment of the image processing apparatus of the present invention.

Further, in the present invention, as shown in FIG. 3B, in a case where two systems of processing sections are provided in parallel for outputting the print and for outputting the image file respectively, in order to clarify the characteristics of the present invention, when the case is shown by using the denoting method as shown in FIGS. 4A and 4B, it can be shown in a manner as shown in FIG. 5A.

In FIG. 5A, a print converting unit 92 and a file converting unit 94 have two systems of converting units respectively. Also in this embodiment, it goes without saying that each of the converting units 92 and 94 may have one unit either for outputting the print only or for outputting the file only.

The former case, namely, the case of 2 systems of converting units is appropriate to a dedicated hardware (H/W) processing. In this regard, it is preferable that respective systems of the converting units are composed of ASIC, PLD and the like for performing processing.

Figure 5B:
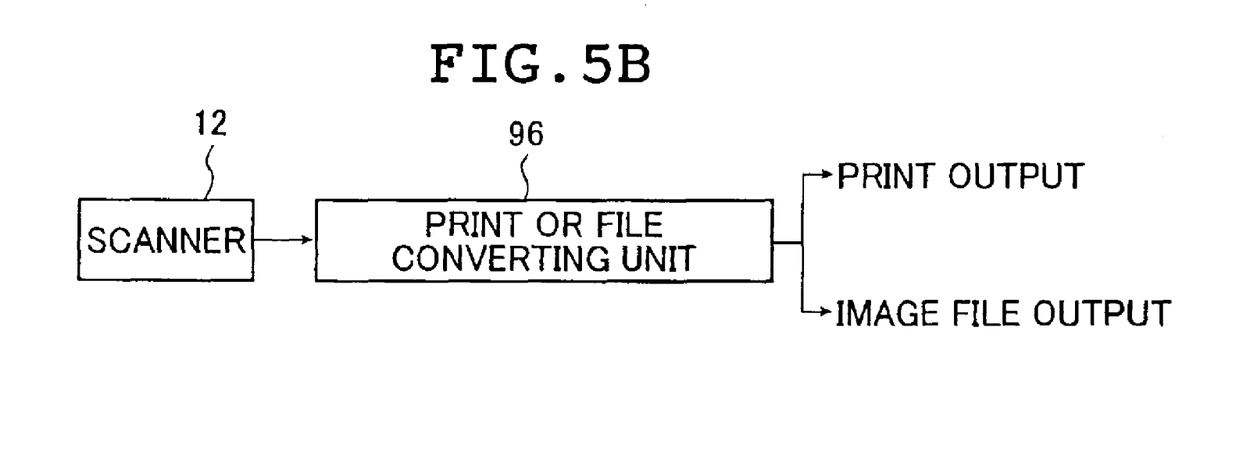

On the other hand, as shown in FIG. 5B, the converting unit may have only one system of a common converting unit 96 and switch from the conversion for the print to the conversion for file or vice versa.

A case of one system as described above is appropriate to software (S/W) processing whereupon one system is used by switching from one software to another or inserting a different type of parameter in accordance with a required conversion. In this regard, it is preferable that the conversion to be conducted by such one system of converting unit is processed by means of DSP, CPU and the like.

In the above embodiment, when both of the print and the image file are output, the resolution of the fine scan is set so as to cope with an output size which is larger of the print and the image file. However, the present invention is not limited to thus, and various examples are available.

In the above method in which the resolution of the fine scan is made to be adjusted to a larger one of the output sizes of the print and the image file, the electronic magnification rate of the one of the print and the image file, which has a smaller size, tends to be reduced than usual. In other words, for the one of the print and the image file, which has a smaller size, the resolution of the fine scan is too high. Accordingly, it is possible to output a high quality image in accordance with the size (the number of output pixels) both in the cases of the print and the image file. Specifically, this example is suitable for the case where high quality images are required for the print and the image file.

In the present invention, the resolution of the fine scan may be set in accordance with the one of the print and the image file, which has a smaller output size.

In order to perform image reading with a high resolution, an operation such as pixel shifting is necessary in some cases. Consequently, the fine scan takes much time. On the contrary, when the fine scan is performed in accordance with a resolution of one of the print and the image file, which has a smaller output size, it is possible to perform the fine scan with the fastest speed, and hence preparations of both of the print and the image file can be achieved with a high efficiency. Specifically, this example is suitable for the case where a high productivity is demanded.

Furthermore, in the present invention, the resolution of the fine scan may be always set in accordance with the print size regardless of the size of the image file.

A main stream of the output in the photoprinter 10 is the print generally. According to this example, the print with a high image quality can be output stably. Specifically, deterioration in performance of the photoprinter 10 can be removed, and the print can be output with a high efficiency.

Furthermore, in the present invention, it is possible to adopt an image processing apparatus described below. In this image processing apparatus, two or more methods among the above three methods are selectively available: the first is the method in which the resolution of the fine scan is set in accordance with one of the print and the image file, which has a larger output size; the second is the method in which the resolution of the fine scan is set in accordance with one of the print and the image file, which has a smaller output size; and the third is the method in which the resolution of the fine scan is set in accordance with the print size. For example, a high quality image mode, a high speed mode and a print-priority mode are selectively available, and an operator can selectively set the mode according to an order from a customer.

In the above embodiment, input image data obtained by a single image reading operation is subjected to two types of conversion processing including a file conversion for obtaining image data for image file output and a print conversion for obtaining image data for print output. The present invention is not however limited to this embodiment. If the conversion performed is intended for obtaining two or more types of output image data of which the data formats are different from each other, the two or more types of output image data may be obtained and outputted by performing two or more types of conversion. To this end, according to the present invention, output image data of which the data formats are different from each other may be separately outputted from two or more converting units; or one type of output image data may be outputted from one of two converting units used, and other two or more types of output image data of which the data formats are different from each other and also different from that of the above output image data, from the other converting unit.

As described above, the image processing apparatus and the image processing method according to the present invention have been described in detail. The present invention is not limited to the above described embodiments, and it should be understood that various changes, substitutions and alternations can be made therein without departing from spirit and scope of the inventions as defined by the appended claims.

As described above in detail, according to the image processing method and the image processing apparatus of the present invention, the one fine scan makes it possible to output the both of the photographic print and the image file having a high image quality by a simple operation and with a good operation efficiency.

What is claimed is:

1. An image processing method in which an original image is read photoelectrically to obtain input image data, and the thus obtained input image data is subjected to image processing to obtain output image data, comprising the steps of:

performing first conversion for outputting an image file and second conversion for outputting a print as said image processing on the input image data obtained by a single image reading operation; and outputting first image data for outputting the image file and second image data for outputting the print, wherein said single image reading operation is performed with a resolution corresponding to a larger number of pixels required for outputting the image file or the print in accordance with the sizes of the image file and the print to be output.

2. The image processing method according to claim 1, wherein the resolution of said single image reading operation is set in accordance with output information of the print and the image file.

3. The image processing method according to claim 1, wherein said single image reading operation is performed with the resolution corresponding to one of sizes of the image file and the print to be output.

4. The image processing method according to claim 1, wherein at least one of said first conversion for outputting the image file and said second conversion for outputting the print includes an output color conversion, or the output color conversion and an image format conversion as said image processing.

5. The image processing method according to claim 4, wherein said image format conversion selects presence or absence of an image compression, and wherein, when said image compression is performed, said image format conversion also selects presence or absence of a change of compression ratios.

6. The image processing method according to claim 1, wherein said first conversion for outputting the image file and said second conversion for outputting the print comprise respective sharpness processing as said image processing, and wherein at least one of a method and an intensity of said sharpness processing is changed in accordance with said first conversion for outputting the image file and said second conversion for outputting the print.

7. The image processing method according to claim 1, wherein same processing to be conducted in said first conversion for outputting the image file and said second conversion for outputting the print as said image processing is conducted in common as common processing in both of said first and second conversions.

8. The image processing method according to claim 1, wherein the single image reading operation is a fine scan.

9. The image processing method according to claim 1, wherein the first conversion and the second conversion are carried out in parallel.

10. An image processing apparatus that reads an original image photoelectrically to obtain an input image data which is then subjected to image processing to obtain output image data, comprising:
a file converting unit for converting said input image data to first image data for outputting an image file;
a print converting unit for converting said input image data to second image data for outputting a print; and
a switching unit for performing switching operations among a first conversion of the input image data only by said file converting unit wherein said input image data is obtained by a single image reading operation, a second conversion of the input image data only by said print converting unit wherein said input image data is obtained by the single image reading operation, and both of said first and second conversion of the input image data by both of said file converting unit and said print converting unit wherein the image data is obtained by the single image reading operation, wherein said single image reading operation is performed with a resolution corresponding to a larger number of pixels required for outputting the image file or the print in accordance with the sizes of the image file and the print to be output.

11. The image processing apparatus according to claim 10, wherein the resolution of said single image reading operation is set in accordance with output information of the print and the image file.

12. The image processing apparatus according to claim 10, wherein said single image reading operation is performed with the resolution corresponding to one of sizes of the file and the print to be output.

13. The image processing apparatus according to claim 10, wherein at least one of said file converting unit and said print converting unit includes an output color converting unit, or both the output color conversion and an image format converting unit.

14. The image processing apparatus according to claim 13, wherein said image format converting unit selects presence or absence of an image compression, and wherein, when said image compression is performed, said image format converting unit also selects a change of compression ratios.

15. The image processing apparatus according to claim 10, wherein said file converting unit and said print converting unit perform respective sharpness processing in which at least one of a sharpness processing method and a sharpness intensity is different in accordance with said file converting unit and said print converting unit.

16. The image processing apparatus according to claim 10, wherein said file converting unit and said print converting unit have in common a common processing unit which performs same processing.

17. The image processing apparatus according to claim 10, wherein the single image reading operation is a fine scan.

18. The image processing apparatus according to claim 10, wherein the input image data converted at the file converting unit is a fine scanned image.

19. The image processing apparatus according to claim 10, wherein if both of said first and second conversions of the input image data by both of said file converting unit and said print converting unit are performed, both of the first and second conversions are performed in parallel.

20. An image processing method in which input image data obtained from an original image is subjected to image processing to obtain output image data, comprising the steps of:
converting the input image data obtained by a single image reading operation to obtain two or more types of output image data which have different data formats from each other; and
outputting the thus obtained two or more types of output image data as said output image data, wherein said single image reading operation is performed with a resolution corresponding to a larger number of pixels required for outputting the image file or the print in accordance with the sizes of the image file and the print to be output.

21. The image processing method according to claim 20, wherein said two or more types of output image data are two types including first output image data and second output image data.

22. The image processing method according to claim 21, wherein said first output image data is for outputting a print and said second output image data for outputting an image file.

23. The image processing apparatus according to claim 20, wherein the single image reading operation is a fine scan.

24. The image processing method according to claim 20, wherein the two or of output image data which have different data formats from each other are obtained.

25. An image processing apparatus in which input image data obtained by photoelectrically reading an original image is subjected to image processing to obtain output image data, comprising:
a converting section for converting the input image data obtained by a single image reading operation to two or more types of output image data having different data formats from each other; and
a switching unit for performing switching operations to select a conversion process to be used in said converting section in accordance with at least one type of output image data in the two or more types of output image data having different data formats from each other which are outputted from the converting section, wherein said single image reading operation is performed with a resolution corresponding to a larder number of pixels required for outputting the image file or the print in accordance with the sizes of the image file and the print to be output.

26. The image processing apparatus according to claim 25, wherein said converting section includes:
a first converting unit for converting said input image data to first output image data; and
a second converting unit for converting said input image data to second output image data which has a different data format from said first output image data; and
wherein switching operations are performed in said switching unit among a first conversion of the input image data obtained by a single image reading operation only with said first converting unit, a second conversion of said input image data only with said second converting unit, and a third conversion of said input image data with both of said first and second converting units.

27. The image processing apparatus according to claim 26, wherein said first converting unit is a converting unit for a print and said first output image data is for outputting the print, and wherein said second converting unit is a converting unit for an image file and said second output image data is for outputting the image file.

28. The image processing apparatus according to claim 25, wherein the single ing operation is a fine scan.

29. The image processing apparatus according to claim 25, wherein the section converts the input image data obtained by the single image reading operation ore types of output image data in parallel.

* * * * *